United States Patent [19]

Davis

[11] Patent Number: 4,721,406
[45] Date of Patent: Jan. 26, 1988

[54] FRICTION PIVOT JOINT FOR A WINDOW STAY

[76] Inventor: Ronald P. Davis, 77 Breaker Bay Road, Wellington, New Zealand

[21] Appl. No.: 877,275

[22] Filed: Jun. 23, 1986

[30] Foreign Application Priority Data

Jun. 28, 1985 [NZ] New Zealand .......................... 212599
Oct. 9, 1985 [NZ] New Zealand .......................... 213772

[51] Int. Cl.[4] ............................................. F16C 17/12
[52] U.S. Cl. ................................. 403/163; 403/146; 403/408.1; 384/129
[58] Field of Search .............. 403/161, 162, 163, 146, 403/225, 227, 228, 408; 384/129, 439; 16/273

[56] References Cited

U.S. PATENT DOCUMENTS

| | | | |
|---|---|---|---|
| 2,940,785 | 6/1960 | Haushalter | 403/227 X |
| 3,214,125 | 10/1965 | Pyuro | 403/163 X |
| 3,591,216 | 7/1971 | Onufer | 403/161 X |
| 4,405,256 | 9/1983 | King, Jr. | 403/228 X |
| 4,582,435 | 4/1986 | Davis | 403/163 X |

FOREIGN PATENT DOCUMENTS 591219 4/1959 Italy .................................... 384/129

*Primary Examiner*—Randolph A. Reese
*Assistant Examiner*—Joseph A. Fischetti
*Attorney, Agent, or Firm*—McAulay, Fields, Fisher, Goldstein & Nissen

[57] ABSTRACT

A friction pivot joint for use between two components such as two arms, or an arm and a frame or sash plate, of a window stay. The joint comprises an aperture in a first of the components, an annular shoulder surrounding and projecting from the periphery of the aperture, an aperture in the second component such that the component is located about the shoulder. A self-lubricating and wear-resistant bushing interposed between the shoulder and the second component to prevent direct contact therebetween and a fixing element extends through the joint and is fixed within the aperture below the shoulder so as to apply friction creating pressure to the joint.

20 Claims, 3 Drawing Figures

FRICTION PIVOT JOINT FOR A WINDOW STAY

BACKGROUND OF THE INVENTION

1. Field of the Invention

My present invention comprises a friction pivot point, of a type particularly suitable for use as a friction pivot joint in a window stay.

2. Description of Related Art

Such friction pivot joints as are described in, for example, New Zealand patent specification Nos. 144922/146130/146886, 162919, 196479 are typically employed to frictionally movably couple two arms of a window stay, or an arm of a stay and a frame or sash plate, and comprise a rivet which extends through two apertures formed one in each of the adjacent ends of the arms to be joined and a bushing formed of a self-lubricating material such as nylon or suitable plastics material, interposed therebetween to prevent metal to metal contact in the joint between moving parts of the arms and rivet. When such joints are provided in window stays it is important that the joint be accurately formed and the rivet, which holds the joint together and applies the friction providing pressure thereto, properly centered. If the rivet is off-centre and/or 'leaned' to one side during manufacture for example, the joint will be inaccurately formed and the arms will not extend in the same plane. Any misalignment at the joint is magnified at the distal ends of the arms and thus it is important that such joints are so constructed as to minimize such difficulties.

An improved form of such a friction pivot joint is described in my New Zealand patent specification No. 202214/202755 wherein the joining rivet is eliminated.

Reference is also made to U.S. Pat. No. 4,582,435 which is based on the New Zealand patent specification Nos. 202,214 and 292,755. Instead, arm material is extruded from the end of one arm through an aperture formed in the end of the other arm so that a 'turret' of arm material is provided at the end of the first arm, which turret extends through the aperture in the other arm. In the formed joint a self-lubricating bushing is interposed between the turret of the one arm and the other arm and the turret is crimped down to form a permanent joint. This form of bearing is conveniently referred to as an integral bearing. In order that sufficient material is present in the arm in which the turret is formed, to enable the turret to be formed therein, it is necessary that this arm at least be of a substantial thickness and this, rather than the strength of the arm required, is a limiting factor on the thickness of the arm provided. It is typically necessary to provide a significantly thicker arm than would otherwise be required simply to provide the required strength alone.

SUMMARY OF THE INVENTION

My present invention provides an improved or at least alternative form of friction pivot joint.

In broad terms my invention may be said to comprise a friction pivot joint between two components such as two arms, or an arm and a frame or sash plate of a window stay, said joint comprising an aperture in a first of the components, an annular shoulder surrounding said aperture, an aperture in said second component whereby said second component is located about said shoulder, a bushing of a self-lubricating and wear-resistant material interposed between said shoulder and said second component to present direct contact therebetween, and a fixing component fixing the joint and applying friction creating pressure thereto extending through the joint and fixed within or beneath said shoulder so as to apply friction creating pressure to the joint or in said aperture.

Preferably the said shoulder is formed by the displacement of material from the relevant arm and the shoulder is conveniently referred to as a 'displacement'. The shoulder may however comprise a separately formed and subsequently fitted insert.

It is preferred that the said fixing means comprises a body portion which may be of a generally cylindrical formation and a top portion which may be of a generally peripheral flange-like formation. In such a form the fixing means is conveniently termed a 'button'.

The pivot joint of the invention may be friction adjustable so that the friction creating pressure within the joint may be varied. It may be desired to adjust the friction of the joint to compensate for wear (if any) occurring in the joint components for example. An increase in friction may be achieved by compression of the fixing means to further close the joint.

BRIEF DESCRIPTION OF THE DRAWING

Preferred forms of friction pivot joint of the invention are illustrated in the accompanying drawings, by way of example, wherein.

DESCRIPTION OF THE PREFERRED EMBODIMENT

Figure 1:
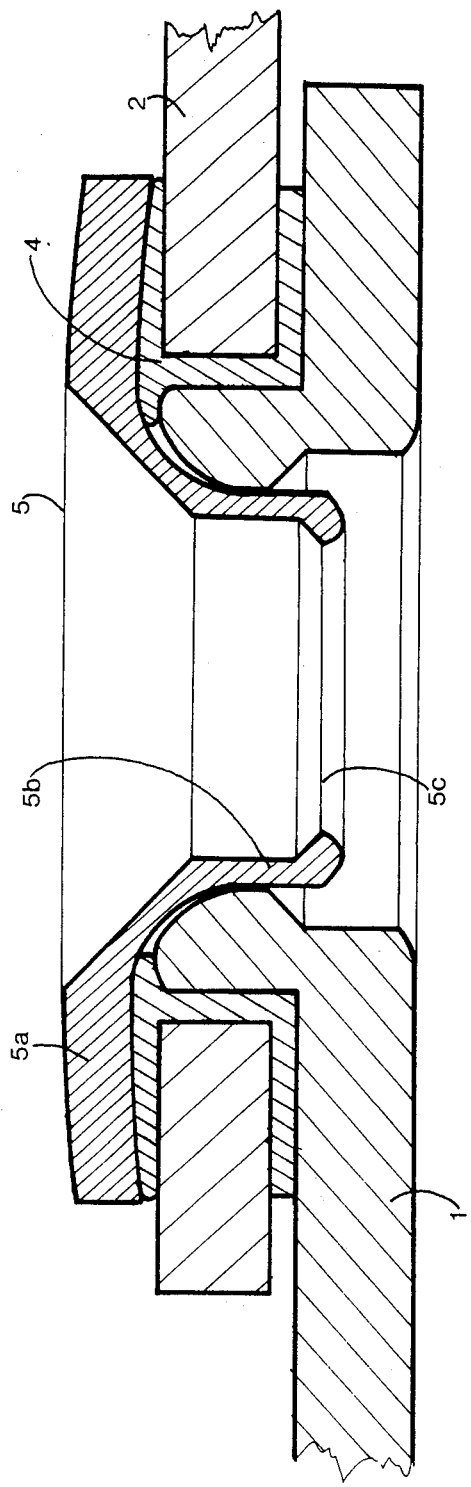
FIG. 1 is a cross-sectional view of a first preferred form friction pivot joint, which does not comprise friction adjustment, with the components thereof being assembled together but prior to fixing of the joint.
Figure 2:
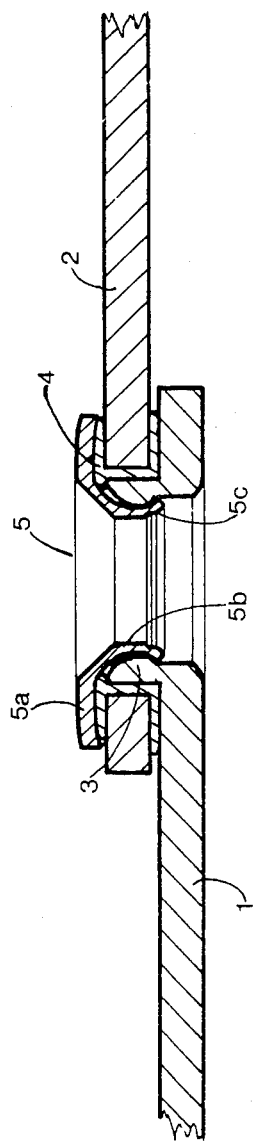
FIG. 2 is a cross sectional view of the first preferred form friction pivot joint of FIG. 1 after fixing of the joint.

In the preferred forms of joint illustrated, a portion of a first component such as a frame or sash plate or the end of a first arm is indicated at 1. A second component such as an arm is indicated at 2. An aperture is formed in the first of the components 1, and an annular shoulder 3 surrounds and projects from the periphery of the aperture as shown. In the preferred forms of joint the annular shoulder 3 is formed by displacement of arm material in the forming of the aperture in the component 1, and the shoulder 3 may thus be referred to as a displacement. An aperture is formed in the second component 2 whereby the second component is located about the shoulder 3. A bushing or sleeve 4 is interposed between the components 1 and 2, so that there is no direct or metal to metal contact therebetween. The bushing 4 is formed of a suitable self-lubricating and wear-resistent material such as nylon or other suitable plastics material. A 'fixing means' for fixing the joint extends through the joint and is fixed beneath the shoulder 3 to fix the joint and apply friction creating pressure thereto. The said fixing means 5, referred to as a button, comprises top portion 5a extending generally radially and of a peripheral flange-like formation which extends over the second component 2 via the bushing 4 as shown, and a body portion 5b of a generally cylindrical formation which extends through the joint and the shoulder or displacement and which is engaged beneath the shoulder 3 by crimping or the like from the position shown in FIG. 1 to that shown in FIG. 2. The body portion 5b of the button preferably comprises an enlarged lower peripheral rim part 5c which is engaged beneath the shoulder 3. The engagement of the button 5 into the joint and crimping of the rim portion 5c thereof is so effected as to cause friction creating pressure to be applied to the joint to the extent desired.

The preferred forms of joint described may be assembled with relative ease while still maintaining the required degree of precision and in particular of accurate centreing of the joint. The connected components such as arms are located and centred to one another by virtue of the shoulder 3. The button 5 is suitably inserted by way of a pin extending through the centre of the button to effect centreing thereof. It is not possible for the button to 'lean' during manufacture or the like so that problems with centreing are substantially eliminated. As the shoulder 3 need not be of a large dimension height-wise it may be integrally formed from arms of a lesser thickness by 'extrusion' of arm material so that as is the case with the integral bearing the amount of arm material required for such extrusion purposes is not a limiting factor on the thickness of the arm required. With the integral bearing it is typically necessary to provide a significantly thicker arm than would otherwise be required simply to provide the required strength alone, for this purpose. In manufacture of the joint it is preferred that the bushing be insert moulded onto the component 2.

Figure 3:
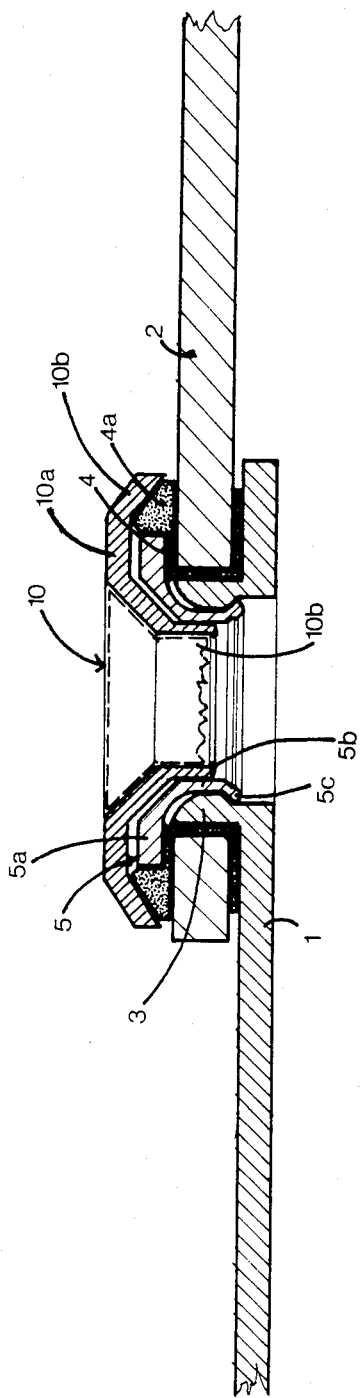
FIG. 3 is a cross-sectional view of a second preferred form of friction pivot joint which comprises friction adjustment.

The second preferred form of joint shown in FIG. 3 is friction adjustable and includes one form of friction adjustment. A friction adjustment cap indicated at 10 is interposed between the fixing means or button 5 and a threaded fastener such as a screw, a part of which is shown in phantom outline. The friction adjustment cap includes a peripheral rim portion 10a which extends over the peripheral edge of the top portion 5a of the fixing button 5 and which is shaped as shown. The cap 10 may also include a locating portion 10b which extends into the hollow interior or the fixing button 5 as shown, in a moderate friction fit. The bushing 4 may in this form of joint include an annular enlargement 4a as generally shown. If the friction joint is mounted to a window frame and sash the screw fastener may be a fixing screw whereby the stay is secured to the frame or sash which is screwed there-into. If adjustment of the friction of the joint is required the screw fastener can be tightened such that the friction adjustement cap 10 will be forced down onto the fixing button 5 so that further friction providing pressure will be applied to the bushing 4 and the joint generally. The peripheral rim portion 10b of the friction adjustment cap 10 on the shoulder 4a of the bushing 4 will act to prevent bushing material from 'escaping' from the joint.

In a variation of the second preferred form of joint the screw fastener enabling friction adjustment of the joint may be threaded into threads provided on the side walls of the aperture in the component 1.

The friction adjustment cap 10 does not add significant extra bulk to the joint. In a joint having a total depth or height of 5 mm for example only 1mm extra is added.

The foregoing describes my invention including preferred embodiments thereof. Alterations and modifications as will be obvious to those skilled in the art are intended to be incorporated within the scope hereof, as defined in the following claims.

I claim:
1. A friction pivot joint for use between two components such as two arms, an arm and a frame or sash plate of a window stay, said friction pivot joint comprising:
   a first of said components having a first aperture; and an annular periphery surrounding said first aperture;
   an annular shoulder surrounding and projecting from said annular periphery;
   a second of said components having a second aperture; said second component being juxtaposed to said first component, said second component including a wall surrounding said second aperture, and said second aperture having a diametrical extent greater than the diametrical extent of said shoulder to permit said shoulder to fit within said second aperture in an assembled condition of said first and said second components;
   a self-lubricating and wear-resisting bushing interposed between said shoulder and said wall for prevention of contact therebetween; and
   means fixing said components together and extending through said joint, said fixing means including means for pressure fixing said fixing means within said first aperture directly to and below said shoulder for applying friction creating pressure to said joint.

2. A friction pivot joint as claimed in claim 1, wherein said pressure fixing means comprises a body portion engaged beneath said shoulder, said fixing means extending generally radially from the upper part of said body portion over said second component.

3. A friction pivot joint as claimed in claim 2, wherein said body portion is of a generally cylindrical formation and said top portion is of a generally peripheral flange-like formation.

4. A friction pivot joint as claimed in claim 2, wherein said bushing extends between said components and between the internal surface of a first external surface of said shoulder, and said second component and said fixing means top portion.

5. A friction pivot joint as claimed in claim 1, including a friction cap comprising a peripheral rim portion and a locating portion, said locating portion extending into a hollow interior of said fixing means, and said peripheral rim portion extending over said bushing for preventing escape thereof.

6. A friction pivot joint as claimed in claim 5, wherein said joint is friction adjustable, the arrangement being such that an increase in friction is achieved by compression of said fixing means to further close the joint.

7. A window stay incorporating one or more friction pivot joints as claimed in claim 1.

8. A friction pivot joint as claimed in claim 1, wherein said fixing means includes a body portion engaged in said first aperture and a top portion extending generally radially from the upper part of said body portion over said second component.

9. A friction pivot joint as claimed in claim 1, wherein said fixing means additionally includes means for frictionally adjusting said fixing means from compression thereof in said first aperture to close the joint further.

10. A friction pivot joint as claimed in claim 1, wherein said pressure fixing means includes an enlarged lower peripheral rim part which is engaged with said first component beneath said shoulder where said shoulder joins said first component thereby causing the friction creating pressure.

11. A friction pivot joint as claimed in claim 1, wherein said joint is friction adjustable, the arrangement being such that an increase in friction is achieved by compression of said fixing means to further close said joint.

12. A friction pivot joint as claimed in claim 11, wherein said fixing means has a hollow exterior and said joint comprises a threaded fastener to extend through said hollow interior for anchoring therein whereby friction adjustment of the joint may be effected by screw tightening of said threaded fastener.

13. A friction pivot joint as claimed in claim 12, including a friction adjustment cap interposed between said fixing means and said threaded fastener and including a peripheral rim portion extending over the peripheral edge of the top portion of said fixing means to assist in containing material of said bushing during tightening of said threaded fastener.

14. A friction pivot joint as claimed in claim 13, including a friction adjustment cap comprising a locating portion extending into the hollow interior of said fixing means and wherein said peripheral rim portion thereof is of a general flange-like formation.

15. A window stay incorporating one or more friction pivot joints as claimed in claim 14.

16. A friction pivot joint for use between two components such as two arms, an arm and a frame or sash plate of a window stay, said friction pivot joint comprising:
- a first of said components having a first aperture; and an annular periphery surrounding said first aperture;
- an annular shoulder surrounding and projecting from said annular periphery;
- a second of said components having a second aperture, said second component being juxtaposed to said first component, said second component including a wall surrounding said second aperture, and said second aperture having a diametrical extent greater than the diametrical extent of said shoulder to permit said shoulder to fit within said second aperture in an assembled condition of said first and said second components;
- a self-lubricating and wear-resisting bushing interposed between said shoulder and said wall for prevention of contact therebetween; and
- means fixing said component together and extending through said joint, said fixing means including means for pressure fixing said fixing means within said first aperture below said shoulder for applying friction creating pressure to said joint;
- said fixing means being provided with a hollow interior; and
- said joint comprising a threaded fastener extending through said hollow interior for anchoring thereof to said fixing means therebetween such that friction adjustment of the joint may be effected by screw tightening of said threaded fastener.

17. A friction pivot joint as claimed in claim 16, including a friction adjustment cap interposed between said fixing means and said threaded fastener and including a peripheral rim portion extending over the peripheral edge of the top portion of said fixing means to assist in containing material of said bushing during tightening of said threaded fastener.

18. A friction pivot joint is claimed in claim 17, wherein said friction adjustment cap comprises a locating portion extending into the hollow interior of said fixing means and wherein said peripheral rim portion thereof is of a general flange-like formation.

19. A window stay incorporating one or more friction pivot joints as claimed in claim 18.

20. A friction pivot joint for use between two components such as two arms, an arm and a frame or sash plate of a window stay, said friction pivot joint comprising:
- a first of said components having a first aperture; and an annular periphery surrounding said first aperture;
- an annular shoulder surrounding and projecting from said annular periphery;
- a second of said components having a second aperture, said second component being juxtaposed to said first component, said second component including a wall surrounding said second aperture, and said second aperture having a diametrical extent greater than the diametrical extent of said shoulder to permit said shoulder to fit within said second aperture in an assembled condition of said first and said second components;
- a self-lubricating and wear-resisting bushing interposed between said shoulder and said wall for prevention of contact therebetween; and
- means fixing said components together and extending through said joint, said fixing means including means for pressure fixing said fixing means within said first aperture below said shoulder for applying friction creating pressure to said joint;
- said pressure fixing means comprising a body portion engaged beneath said shoulder, said fixing means extending generally radially from the upper part of said body portion over said second component;
- said bushing extending between said components and between the internal surface of a first external surface of said shoulder, and said second component and said fixing means top portion; and
- said body portion comprising an enlarged lower peripheral rim part for fixing the body portion of said fixing means to said first component by engagement of said lower peripheral rim part therewith beneath said shoulder.

* * * * *